Figure 1:
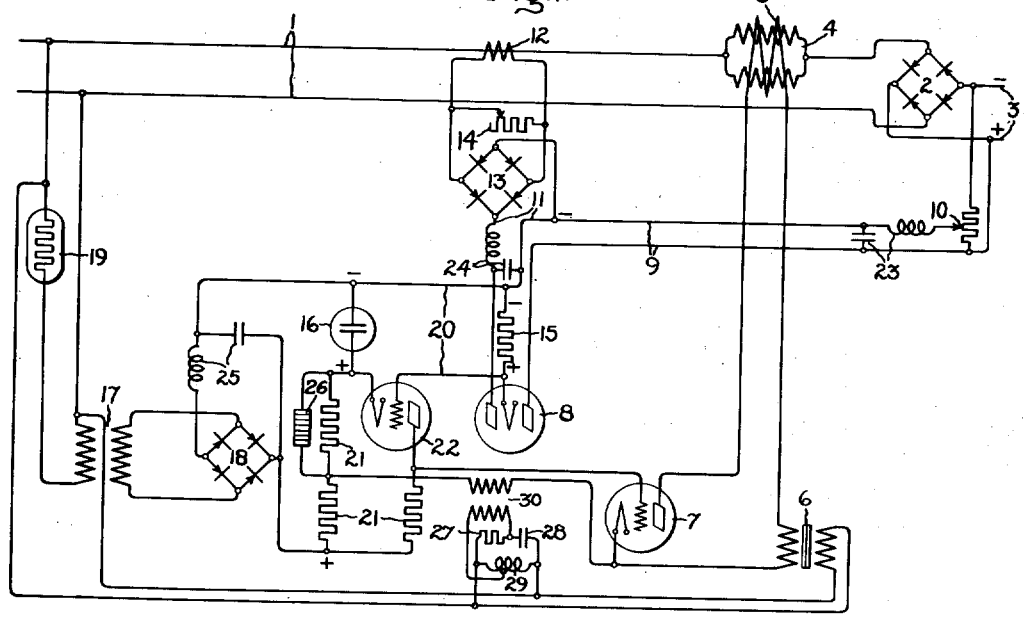

Oct. 29, 1935.    O. W. LIVINGSTON    2,019,352
ELECTRICAL CONTROL CIRCUITS
Filed March 29, 1934    2 Sheets-Sheet 1

Inventor:
Orrin W. Livingston,
by Harry E. Dunham
His Attorney.

Oct. 29, 1935.    O. W. LIVINGSTON    2,019,352
ELECTRICAL CONTROL CIRCUITS
Filed March 29, 1934    2 Sheets-Sheet 2
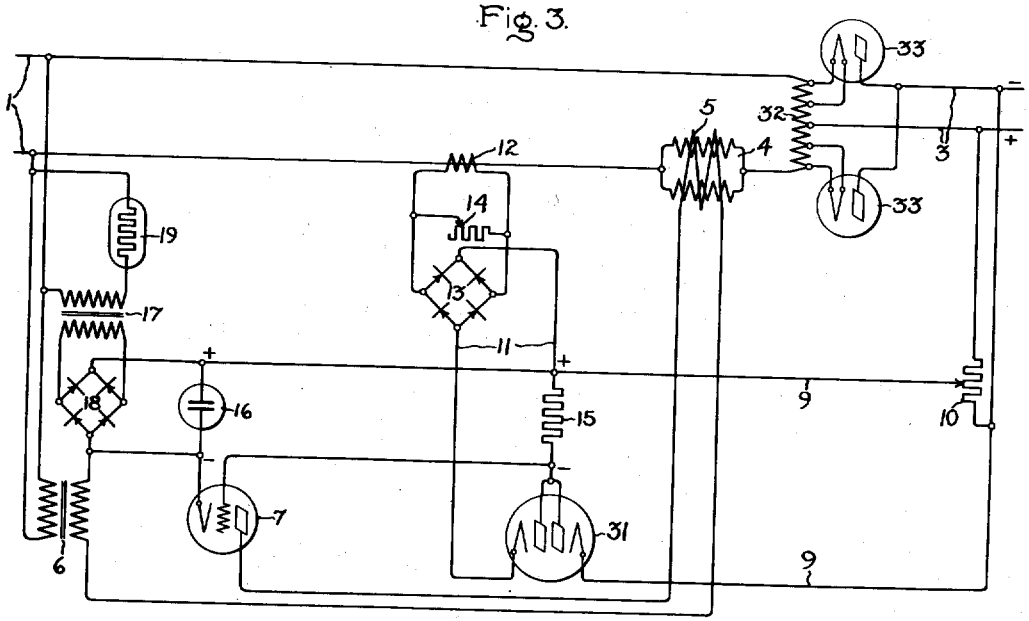
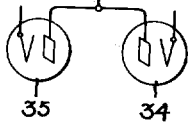
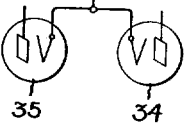
Inventor:
Orrin W. Livingston,
by Harry E. Dunham
His Attorney.

Patented Oct. 29, 1935

2,019,352

UNITED STATES PATENT OFFICE 2,019,352

ELECTRICAL CONTROL CIRCUITS

Orrin W. Livingston, Schenectady, N. Y., assignor to General Electric Company, a corporation of New York Application March 29, 1934, Serial No. 718,094

17 Claims. (Cl. 175—363)

My invention relates to electrical control circuits and more particularly to a novel vacuum tube type electrical regulating system.

It is often desirable to limit any one of a plurality of related electrical quantities to respective maximum values. Furthermore, it is often desirable to regulate one of said quantities to a constant value so long as the others are below their respective maximum values and successively to transfer control as the other quantities reach their maximum values, so as to limit them to said values. As a two quantity example, it is often desirable to maintain the voltage of an electric translating circuit constant over a given current range, while at the same time limiting maximum current in the circuit to a predetermined value.

In accordance with my invention, I provide a novel vacuum tube control circuit for accomplishing the results outlined above. Briefly stated, this control circuit operates on the principle that if variable potentials, corresponding to the two quantities mentioned above, are applied, respectively, to vacuum tube anode-cathode conducting paths and if one of the corresponding electrodes of each path is interconnected so as to have the same potential, current will tend to flow only between the anode and cathode of the path to which the greater potential is applied. This is particularly true for small current values, such as can be employed for controlling the grids, or control electrodes, of vacuum tubes. The explanation of this is that for such small currents, the voltage drop in an anode-cathode conducting path is so small as to be negligible, so that for example, if the corresponding electrodes are the cathodes of the paths and if positive potentials are applied to the anodes of the paths, the cathodes will automatically become more positive than the anodes of all of the paths except the path to which the highest anode potential is applied. As my invention utilizes a plurality of anode-cathode paths each having an equi-potential corresponding electrode, I may utilize a single multi-electrode vacuum tube having a common electrode, such for example, as a common anode with respect to a plurality of cathodes, or a common cathode with respect to a plurality of anodes. With such a device it is unnecessary to provide an interconnection between the common electrodes, as the common electrodes are one and the same element. As applied in my invention I refer to such a device as a transfer tube.

It is immaterial to my invention in its broader aspects whether the anode-cathode conducting paths of my invention are in high vacuum pure electron discharge type vacuum tubes, or whether they are in gas or vapor filled arc discharge tubes. I at present prefer to employ a high vacuum type tube because at the small values of anode current which I employ the space charge effect of such tubes is negligible, so that the voltage drop therein is very small and highly uniform. In the present commercial arc discharge type tubes the arc drop is sometimes erratic, and this tends to interfere with the reliability of operation of my invention.

One practical application of my invention is to storage battery charging circuits wherein my regulating system may be made to hold constant voltage on the charging circuit up to a predetermined maximum current value. Another application is to testing vacuum tubes.

An object of my invention is to provide new and improved electrical control circuits.

Another object of my invention is to provide new and improved vacuum tube control circuits.

My invention will be better understood from the following description taken in connection with the accompanying drawings and its scope will be pointed out in the appended claims.

Figure 2:
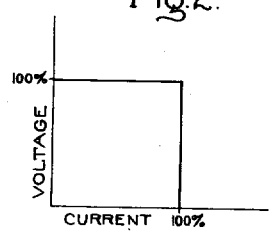

In the drawings, Fig. 1 is a diagrammatic illustration of an embodiment of my invention employing a double anode transfer tube, Fig. 2 shows the voltage-current characteristic of the circuit shown in Fig. 1, Fig. 3 is a modified and simplified circuit showing the use of a double cathode type tube, Fig. 4 illustrates a modification of Fig. 3 wherein two double electrode tubes having interconnected anodes may be substituted for the double cathode transfer tube of Fig. 3, and Fig. 5 illustrates a modification of Fig. 1 wherein two double electrode tubes having interconnected cathodes may be substituted for the double anode tube of Fig. 1.

In Fig. 1 there is shown an electric translating circuit comprising an alternating current supply circuit 1 for energizing a rectifier 2 whose output energizes a direct current load circuit 3. Rectifier 2 is shown by way of example as a bridge connected copper oxide type rectifier, but it should be understood that my invention is not limited to any particular type of rectifier and that for applications of my invention to translating circuits handling appreciable current, it would probably be preferable to use vacuum tube rectifiers of the arc discharge type, such as shown in Fig. 3. In the alternating current supply circuit 1 there is connected a control, or regulating device of any suitable type, such as a saturable core reactor 4 which is provided with a direct current saturating, or control, winding 5 for varying the saturation of the reactor and consequently varying its current limiting impedance or reactance. Winding 5 may be energized from any suitable source of current supply, and as shown it is connected to be energized from the alternating current supply circuit 1 through a suitable transformer 6 and a rectifier 7, shown as a grid controlled rectifier tube. This tube may be of any of the several types well known in the art, but I prefer to use a vapor electric discharge type controlled rectifier because of its greater current carrying capacity and efficiency at higher current values. This tube operates in a well known manner to rectify the output of transformer 6 whenever its grid potential is above a predetermined critical potential with respect to its cathode and to block the current flow between anode and cathode, and consequently the rectifying action, whenever the grid potential is below this predetermined critical value.

The circuit of Fig. 1 controls the conductivity of rectifier tube 7 in response to both the current and voltage of the translating circuit by means of the following arrangement, the main element of which is a double anode vacuum tube 8 which serves the purpose of automatically transferring the control from voltage to current at a predetermined maximum current value. Tube 8 may be of any of the several well known types of double anode rectifier tubes, such for example, as a hot cathode bi-phase high vacuum pure electron discharge type rectifying tube. A circuit 9 is arranged to apply a positive potential to the right-hand anode of tube 8, with respect to its cathode, which is proportional to the voltage of circuit 3. As shown, this circuit connects the positive and negative sides of the circuit 3 to the right-hand anode and the cathode of the tube 8, respectively. Any suitable means for adjusting the relation between the voltage of circuit 3 and the voltage applied to the right-hand anode of tube 8 may be added to the circuit 9 and as shown, a suitable means of this type is an adjustable potentiometer rheostat 10 connected in circuit 9. In a similar manner, a circuit 11 is arranged to apply a positive potential to the left-hand anode of tube 8, with respect to its cathode, which is proportional to the current flow in the translating circuit. As an example of such a circuit there is shown a current transformer 12 connected in the supply circuit 1 and arranged to energize a suitable rectifier 13 whose output is connected with the proper polarity between the cathode and left-hand anode of tube 8. The circuit 11 is also provided with suitable adjusting means, such as a shunt rheostat 14, for varying the relation between the magnitude of the current in circuit 1 and the positive potential applied to the left-hand anode of the tube 8. Connected in circuit with the cathode of tube 8 is a resistor 15, the potential drop across which is proportional to the current flow in the tube 8.

In order to provide a suitable standard or reference quantity against which my regulating system can regulate, I utilize a glow discharge tube 16 which, as is well known to those skilled in the art, has the property of exhibiting a substantially constant potential drop over a relatively wide range of current flow therethrough. The source of current supply for producing the current flow in the discharge tube 16 may be obtained from any suitable source and as shown by way of example, tube 16 is connected to be energized from the alternating current supply circuit 1 through a transformer 17, of suitable voltage ratio, and a suitable rectifier 18 for producing a unidirectional potential across the terminals of the tube 16. As an added means for insuring the constancy of the drop across the tube 16 I utilize a ballast tube, or resistor 19 connected in the energizing circuit for the tube 16. Ballast tubes have the well known property of changing their internal resistance over a relatively wide range with very slight current changes so that they are substantially constant current devices. By the use of the tube 19 the range of current flow through the glow discharge tube 16 for a given range of voltage variation on supply circuit 1 is greatly reduced thereby insuring that tube 16 will operate at all times within the current range over which it exhibits the constant potential drop characteristic.

By means of a circuit 20 glow discharge tube 16 and resistor 15 are connected in series and the energization of the discharge tube 16 is such that the potential drop across it is in opposition to the potential drop across the resistor 15 in the series circuit 20. Consequently, when the current flow through the tube 8 is such that the drop across resistor 15 is equal to the drop across discharge tube 16 there is no net voltage in the series circuit including these devices, while if the potential drop across resistor 15 is less than or greater than the constant drop across the tube 16 a reversible polarity differential control voltage is obtained.

By reason of the particular circuit which I employ it is desirable to provide means for amplifying the above mentioned control voltage and also for reversing it in order to get the proper control of the tube 7 for producing the desired regulatory action. This amplifying and reversing operation is achieved by means of a Wheatstone bridge circuit including three resistors 21 as three of the arms of the bridge and a controllable electric valve 22 as the other arm thereof. This bridge may be energized in any suitable manner and as a convenient way of obtaining its energization it is connected with its input terminals in circuit with the glow discharge tube 16 so as to be energized from the same source of current supply as the tube 16. Valve 22 may be of any suitable type, such for example as a high vacuum pure electron discharge type amplifying tube. This tube is so connected in the bridge circuit that its cathode is connected to the negative input terminal of the bridge and its anode is connected to the right-hand resistor 21. The circuit 20 containing the differential voltage between the constant voltage drop in the tube 16 and the variable voltage drop in the resistor 15 is connected between the grid and cathode of the tube 22 in such a way that whenever the drop in the resistor 15 is greater than the constant drop in the tube 16 the potential of the grid of tube 22 is positive with respect to its cathode, while when the drop in the resistor 15 is less than the drop in the tube 16 the potential of the grid of tube 22 is negative with respect to its cathode. The grid control circuit of tube 7 is connected across the output terminals of the bridge in such a manner that when the grid of tube 22 is negative with respect to its cathode, that is to say, when the impedance of tube 22 is high, the potential of the grid of tube 7 will be positive with respect to its cathode, while when the potential of the grid of tube 22 is positive the potential of the grid of tube 7 will be negative with respect to its cathode.

In order to secure as pure direct current control potentials as possible from the rectifiers 2, 13 and 18, it is desirable to provide band filters and consequently I have shown simple filters of this type at 23, 24 and 25, respectively.

In order to compensate the bridge circuit for the well known non-linear anode-cathode volt-ampere characteristic of the tube 22, I connect an impedance 26 in parallel with one of the two resistances 21, in this case the upper left-hand one, which are electrically adjacent tube 22 in the bridge circuit and arrange this impedance to have a negative impedance current characteristic. One such impedance which I have found to be satisfactory is the well known lightning arrestor material, known to the trade as Thyrite, whose composition is described and claimed in Patent No. 1,822,742, issued September 8, 1931, on an application of Karl B. McEachron, and assigned to the assignee of the present application. This material has the property of reducing its electrical resistance with increases in voltage applied thereto and as the filament-plate characteristic of a high vacuum tube, such as tube 22, is such that its resistance decreases with increases in voltage, the characteristics of the tube 22 and of the impedance 26 compensate each other in the bridge circuit so that the output potential of the bridge which is applied to the grid of the rectifier 7 is substantially independent of the output voltage of the rectifier 18.

It is preferable to control the conductivity of rectifier 7 by shifting the phase of its grid potential rather than by straight magnitude control of its grid potential. This is because phase shift control is a more continuous control than magnitude control because of the fact that control takes place within the half cycles of positive anode potential rather than during successive half cycles of said anode potential in which the tube 7 is either nonconducting or wholly conducting throughout a complete half cycle. One simple way of securing phase shift control is to insert in the grid-cathode circuit of the rectifier 7 a relatively small alternating current potential which lags the potential of the anode-cathode circuit by 90 degrees. The means which I have shown for inserting this quadrature lagging alternating current component consists of a well known impedance phase shifting circuit comprising a resistor 27 and a condenser 28 connected across a mid-tapped reactor which in turn is connected across the alternating current supply circuit 1. To the midpoint of the reactor 29 and to the point between the resistor 27 and the condenser 28 a potential transformer 30 is connected with its secondary winding in the grid circuit of the rectifier 7. By suitably choosing the values of the resistor 27 and condenser 28 the voltage drop therein may be so proportioned that the potential of the point between them is, with respect to the potential of the midpoint of the reactor 29, in quadrature with the supply circuit voltage and by suitably connecting the transformer 30 this potential may be made lagging in the grid circuit of the tube 7.

It should of course be understood that Fig. 1 is merely a diagrammatic and simplified showing of the circuit embodying my invention and for this reason, but a half wave rectifier tube 7 has been shown for supplying the saturating current for the reactor 4. In a commercial circuit it would ordinarily be preferable to utilize a full wave rectifier for this purpose, but as the principle is the same it is believed unnecessary to further complicate Fig. 1 by showing such a full wave rectifier.

The operation of Fig. 1 results in a regulated characteristic which is substantially rectangular in shape and which is illustrated by the ideal regulator characteristic shown in Fig. 2. In this figure, the voltage of the load circuit 3 is shown constant at a predetermined value, designated as 100%, up to a particular predetermined maximum current value, also designated as 100% whereupon the current is held constant and is limited to this 100% value from 100% to zero voltage.

Ignoring for the time being the action of the phase shifting means, the way the circuit of Fig. 1 operates to produce this regulating characteristic is as follows. Assume that alternating current supply circuit 1 is energized by any suitable source of current supply (not shown) and that a load is connected to the direct current circuit load 3 and that the value of this load is such that the current is less than the 100% current shown in Fig. 2. Under these circumstances, potentiometer 10 is adjusted so that with 100% voltage on circuit 3 the potential drop across the resistor 15 produced by the current from the right-hand anode of tube 8 to the cathode is just equal to the constant voltage drop in the glow discharge tube 16. Also the rheostat 14 is adjusted so that for 100% current flow in the translating circuit, the potential of the left-hand anode of tube 8 with respect to the cathode, will just equal the potential of the right-hand anode of the tube 8 with respect to the cathode with 100% voltage on circuit 3. However, as it has been assumed that for the present the current in the translating circuit is less than the 100% value, the potential of the right-hand anode will be greater than the potential of the left-hand anode of the tube 8, and as current only flows between the cathode and the anode at high potential, as previously explained, it will be seen that the potential drop across the resistor 15 will be proportional to the voltage of circuit 3. Assume now that the voltage in circuit 3 drops slightly below the 100% value. As has been explained above, this will make the grid of tube 22 negative. This greatly increases the impedance of the tube 22 with the result that the bridge circuit is unbalanced in such a direction that the point to which the grid of tube 7 is connected becomes positive with respect to the point to which the cathode of tube 7 is connected. Consequently, tube 7 becomes conductive and rectifies the alternating current supplied by the transformer 6, which rectified current flows in the saturating winding 5 of reactor 4. This decreases the reactance of reactor 4 and consequently the voltage drop across it is decreased whereby the voltage of circuit 3 is increased. As soon as the potential of the load circuit 3 increases above the 100% value the voltage drop in the resistor 15 exceeds the voltage drop across the glow tube 16, thereby making the grid of tube 22 positive. This causes the tube to become conductive and greatly reduces its impedance value thereby unbalancing the bridge in the opposite direction and making the grid of the tube 7 negative with respect to its cathode. This substantially reduces the current conducting value of tube 7 to zero thereby preventing a current flow in the saturating winding 5 of the reactor whereby its impedance is greatly increased, thereby increasing the voltage drop across it and reducing the voltage of circuit 3. As a result, the potential drop across the resistor 15 oscillates at a high rate of speed, which depends upon the constants of the entire circuit, between a value slightly above and a value slightly below the constant drop across the glow tube 16 with the result that the voltage of circuit 3 is held substantially at the 100% value at which it is desired to hold it.

The above described operation is analogous to the operation of a Tirrill voltage regulator, in that the action is intermittent because the rectifier 7 is either wholly conductive or wholly non-conductive during the half cycles of positive anode potential, thereby tending to decrease or increase the voltage of circuit 3 by a maximum amount whereby the average voltage held is the normal voltage. However, the presence of the phase shifting circuit produces a much smoother action than the Tirrill action described above because the quadrature lagging alternating current ripple which is superposed on the direct current grid potential of the tube 7 produces a grid potential for the tube 7 which has a sloping wave front so that control can be secured by vary small changes in the amount of direct current component of the grid voltage of the tube 7. For example, at normal voltage of circuit 3, the current through tube 22 is just sufficient to produce a direct current component in the grid circuit of tube 7 which, when added to the alternating current component, will produce a control potential which causes the tube 7 to become conductive in the middle of its half cycle of positive anode potential. Consequently, the tube 7 is conductive for the latter half of each successive half cycle of positive anode potential, thereby holding a substantially uniform average current in the saturating winding 5 of the reactor 4. If now the voltage circuit 3 falls slightly, the direct current component, or output of the bridge circuit increases slightly, thereby causing the total grid voltage of the tube 7 to be raised, and due to the alternating current component, this means that the tube 7 becomes conductive earlier in the half cycles of positive anode potential, thereby increasing the average direct current in winding 5 and increasing the saturation of reactor 4 whereby the voltage of circuit 3 is increased. Similarly, if the voltage of circuit 3 increases above normal the output voltage of the Wheatstone bridge decreases with the result that the tube 7 becomes conductive later in each half cycle of positive anode potential, thereby reducing the average current in the saturating winding 5 and increasing the impedance of the reactor, whereby the voltage of circuit 3 is reduced. This results in a substantially continuous control whereby the time of conductivity of the tube 7 during each half cycle of positive anode potential bears a definite relationship to the voltage of circuit 3.

If now the current flow in the translating circuit tends to exceed the predetermined 100% maximum value, the potential of the left-hand anode of tube 8 exceeds the potential of the right-hand anode and this has the effect of automatically transferring the control from voltage to current, because all of the current in the tube 8 will now flow from the left-hand anode instead of from the right-hand anode so that the voltage drop across resistor 15 will now be proportional to current instead of to voltage. Consequently, as soon as the current exceeds the 100% value set by the rheostat 14, the grid of tube 22 becomes positive thereby rendering the grid of tube 7 negative and stopping the flow of current in the saturating winding 5 of the reactor whereby the impedance of the reactor is increased, thereby increasing its current limiting ability and decreasing the current in the load circuit. Consequently, the current cannot substantially exceed the 100% value which has been set.

The modification shown in Fig. 3 differs mainly from Fig. 1 in that a double cathode type transfer tube 31 is used and the differential control voltage of circuit 20 is applied directly to controlling the rectifier 7 instead of interposing a valve controlled bridge, as in Fig. 1. Also, for the sake of simplicity, the various filters and the phase shifting circuit of Fig. 1 have been omitted. Another minor difference is that the main rectifier comprises a bi-phase rectifier consisting of an auto-transformer 32 and rectifier tubes 33 in place of the copper oxide rectifier 2 of Fig. 1.

As shown the transfer tube 31 has two anodes which are interconnected, but it is obvious that one anode could be employed if desired, as the two interconnected anodes are the equivalent of but a single anode. Similarly, in Fig. 1, two interconnected cathodes could have been employed instead of the single cathode, if desired. Such changes are more or less arbitrary and in no sense change the principle of operation.

Circuits 9 and 11 are connected to the anode-cathode circuits of the tube 31 in such a manner that the normal voltage drop in the resistance 15 is reversed, and similarly the rectifier 18 is so connected that the normal resistance drop in the glow discharge device 16 is reversed with respect to these drops in Fig. 1.

The operation of Fig. 3 is as follows: If the voltage of circuit 3 rises above normal the grid of tube 7 becomes negative with respect to its cathode thereby interrupting the flow of current through the tube 7 and increasing the impedance of reactor 4 thereby decreasing the voltage of circuit 3. If the voltage of circuit 3 falls below normal the constant drop across glow tube 16 exceeds the drop across resistor 15 thereby making the grid of tube 7 positive whereby the tube becomes conductive, thereby causing saturating current to flow in the winding 5 whereby the reactor 4 becomes saturated thereby reducing its reactance and increasing the voltage of circuit 3. This action continues until the current in circuit 3 tends to exceed the 100% value whereupon the potential of circuit 11 exceeds the potential of circuit 9 whereby current flows from the anode of tube 31 to its left-hand cathode and as the drop across this path is small the anode becomes negative with respect to the right-hand cathode so that control is secured by the circuit 11 entirely. Consequently, as the current increases above 100% the grid of tube 7 becomes negative thereby stopping the flow of saturating current in the winding 5 and increasing the impedance of the reactor 4 whereby the current in circuit 3 is substantially limited to the 100% value.

It will, of course, be obvious to those skilled in the art that if desired the filters and phase shifting circuit of Fig. 1 can be added to Fig. 3 without altering the essential principle of operation but merely producing the various specific improvements noted in connection with Fig. 1.

Fig. 4 illustrates a pair of double electrode tubes 34 and 35 connected in a manner in which they could be employed in Fig. 3. Thus, the interconnected anodes could be connected to the resistor 15 and the cathodes of tubes 34 and 35 could be connected respectively to the circuits 9 and 11.

In Fig. 5 are shown a similar pair of tubes connected in a manner in which they could be substituted for the tube 8 of Fig. 1. When so substituted, the common cathodes will be connected to the resistor 15 and the anodes of tubes 34 and 35 will be connected respectively to the control circuits 9 and 11.

While I have shown and described particular embodiments of my invention, it will be obvious to those skilled in the art that changes and modifications may be made without departing from my invention, and I, therefore, aim in the appended claims to cover all such changes and modifictions as fall within the true spirit and scope of my invention.

What I claim as new and desire to secure by Letters Patent of the United States is:

1. In combination, means for producing a plurality of relatively variable control potentials which are responsive respectively to separate quantities which are to be selectively regulated, electroresponsive means, and vacuum tube means for selectively causing said electroresponsive means to respond only to the greater of said potentials.

2. In combination, apparatus having a pair of relatively variable quantities which are to be selectively regulated, means for producing a pair of unidirectional control potentials which vary respectively in accordance with the values of said quantities, control means for said quantities, and vacuum tube means for selectively causing said control means to respond only to the greater of said potentials.

3. In combination, apparatus having a plurality of variable quantities which are to be selectively regulated, means having a plurality of anode-cathode conducting paths, means for maintaining a corresponding electrode of each path at substantially the same potential, means for applying to each anode-cathode path, respectively, a potential which varies in accordance with a different one of said quantities, and electro-responsive means connected to be responsive to the anode-cathode current through said corresponding electrodes.

4. In combination, apparatus having a plurality of relatively variable quantities which are to be selectively regulated, means having a plurality of high vacuum pure electron discharge anode-cathode conducting paths with an effective electrically common electrode, means for applying to each of said paths respectively a potential which varies in accordance with a different one of said quantities, and electroresponsive means responsive to the common electrode current.

5. In combination, apparatus producing a plurality of variable quantities, control means for said quantities, said control means comprising a plurality of anode-cathode vacuum tube conducting paths having means for maintaining a corresponding electrode of each path at the same potential, means for applying to each anode-cathode path, respectively, a direct current potential which varies in accordance with the value of a different one of said quantities, the positive side of said potential being applied to the anodes of said paths, and means responsive to the anode-cathode current through said corresponding electrodes for operating said control means.

6. In combination, an electric valve, means having a plurality of differently controlled anode-cathode conducting paths with an effective electrically common electrode, means for impressing relatively variable potentials on said paths, and means for controlling the conductivity of said valve in accordance with the current flow through said common electrode.

7. In combination, an electric circuit, a saturable reactor therein, a grid controlled rectifier for controlling the value of saturating current in said reactor, means for producing a substantially constant control potential, means including a vacuum tube for producing a control potential which is variable in accordance with the voltage of said circuit up to a predetermined value of current in said circuit and which is variable in accordance with said current at values thereof above said predetermined value, and means for controlling the conductivity of said rectifier in accordance with the difference between said potentials.

8. In a vacuum tube control circuit, means for producing a pair of relatively variable unidirectional control potentials either one of which may exceed the other, means responsive to the greater only of said potentials comprising a double anode vacuum tube to whose anodes the positive sides of said potentials are respectively connected and to whose cathode the negative sides of said potentials are connected whereby current can only flow between the cathode and the anode at the higher potential, and means responsive to said current for producing an electrical control quantity.

9. In combination, an electric translating circuit having two variable electrical quantities, and means for limiting said quantities to respective predetermined maximum values, said means including a double anode vacuum tube to whose respective cathode-anode circuits potentials are applied which vary respectively in accordance with variations in said respective quantities.

10. In combination, an electric translating circuit having two variable electrical quantities, a double anode vacuum tube, means for applying direct current potentials which vary respectively with variations in said quantities to the respective anode-cathode circuits of said tube in such a way that the negative sides of said potentials are connected to the cathode of said tube, and means responsive to the magnitude of the anode-cathode current flow in said tube produced by whichever of said potentials is the greater for regulating the value of the quantity of said circuit corresponding to said higher potential.

11. In combination, an electric translating circuit, a regulating device for controlling the current and voltage of said circuit, a double anode vacuum tube, means for impressing on one of the anodes of said tube a positive potential with respect to the cathode of said tube which varies with the voltage of said circuit, means for impressing on the other anode of said tube a positive potential with respect to said cathode which varies with current in said circuit, and means responsive to the current flow in said tube for controlling said regulating device.

12. In combination, an electric translating circuit, means for holding the voltage of said circuit substantially constant up to a predetermined value of current flow therein and for limiting said current flow substantially to said value comprising a double anode high vacuum rectifying vacuum tube, means for applying a positive potential with respect to the cathode of said tube to one of the anodes thereof, which potential is proportional to the voltage of said circuit, means for applying a positive potential with respect to the cathode of said tube to the other of the anodes of said tube, which last mentioned potential is proportional to the current in said circuit, and means for regulating the impedance of said circuit in accordance with the current flow in said tube.

13. In combination, an alternating current supply circuit, a direct current load circuit, a rectifier interconnecting said circuits, a saturable reactor in said alternating current supply circuit for controlling the current and voltage of said direct current load circuit, means including a grid controlled rectifier for controlling the saturation of said reactor, a bridge circuit including a grid controlled electric valve as one arm thereof, circuit conductors for connecting the grid circuit of said rectifier across the output of said bridge, a double anode vacuum tube, means for impressing on one of the anodes of said tube a positive potential which varies in accordance with the voltage of said load circuit, means for impressing on the other anode of said tube a positive potential which varies in accordance with the current in said load circuit, and means responsive to the magnitude of the current flow through said tube for varying the grid potential of said valve.

14. In combination, means for producing a pair of relatively variable unidirectional control potentials, vacuum tube means having a pair of cathodes and an effective electrically common anode, the positive side of said potentials being connected to said common anode and the negative sides of said potentials being connected to said cathodes respectively whereby current normally will flow only between said common anode and the cathode at the lowest potential difference with respect thereto, and means responsive to said current for producing an electrical control quantity.

15. In combination, an electric translating circuit having two variable electrical quantities, and means for limiting said quantities to respective predetermined values, said means including a double cathode single anode vacuum tube to whose respective cathode-anode circuit potentials are applied which vary respectively in accordance with variations in said respective quantities.

16. In combination, a Wheatstone bridge having input and output terminals, a high vacuum tube connected in one arm of said bridge, and means for compensating the output voltage of said bridge against variations in voltage applied to the input terminals thereof comprising an impedance having a negative resistance-current characteristic connected as a part of an arm of said bridge which is electrically adjacent the arm containing said tube.

17. In combination, a Wheatstone bridge, having input and output terminals, a high vacuum tube connected as one arm of said bridge, and means for compensating the output of said bridge for variations in input voltage comprising a nonlinear impedance connected as a part of another arm of said bridge.

ORRIN W. LIVINGSTON.